2 Sheets—Sheet 1.
A. O'NEILL.
MODE OF CONSTRUCTING AND LAYING MAIN AND SERVICE PIPE
FOR WATER, GAS, &c.
No. 179,947. Patented July 18, 1876.
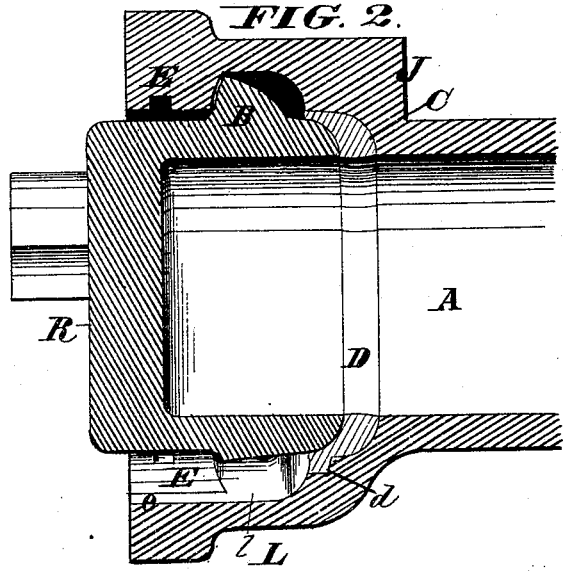
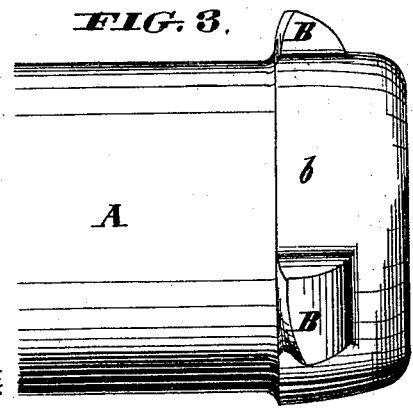
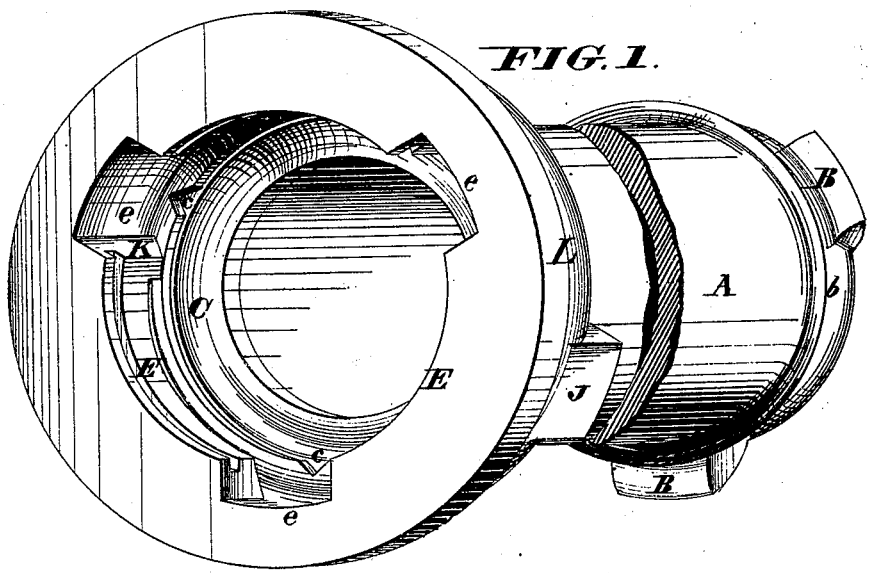
WITNESSES
Chas. J. Gooch
L. Blond. Burdett.
INVENTOR
Andrew O'Neill
By Knight Bros. Attorneys.
N. PETERS, PHOTO-LITHOGRAPHER, WASHINGTON, D. C.

2 Sheets—Sheet 2.
A. O'NEILL.
MODE OF CONSTRUCTING AND LAYING MAIN AND SERVICE PIPE FOR WATER, GAS, &c.
No. 179,947. Patented July 18, 1876.
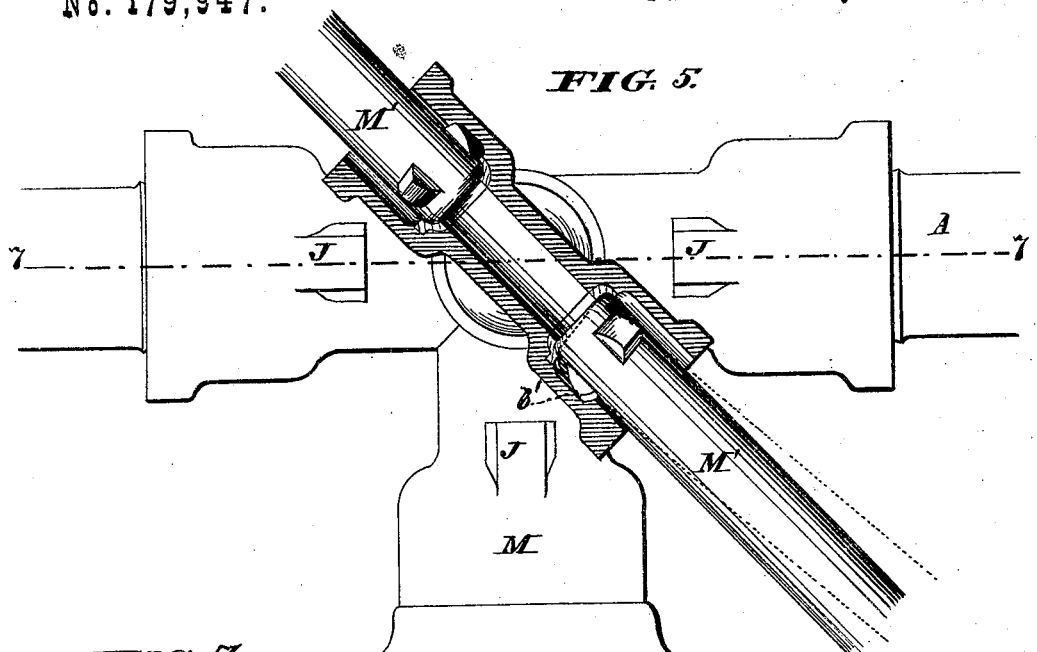
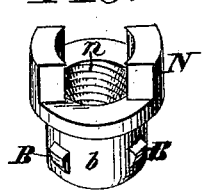
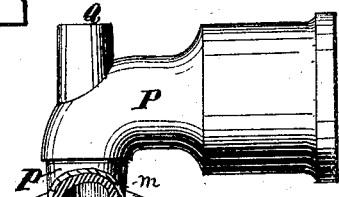
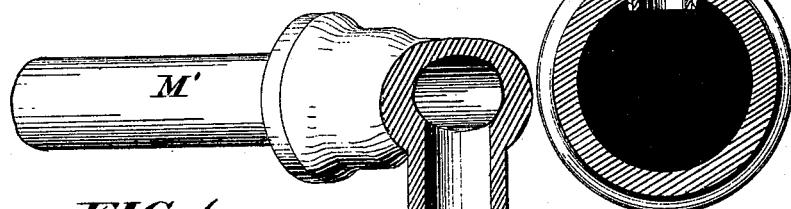
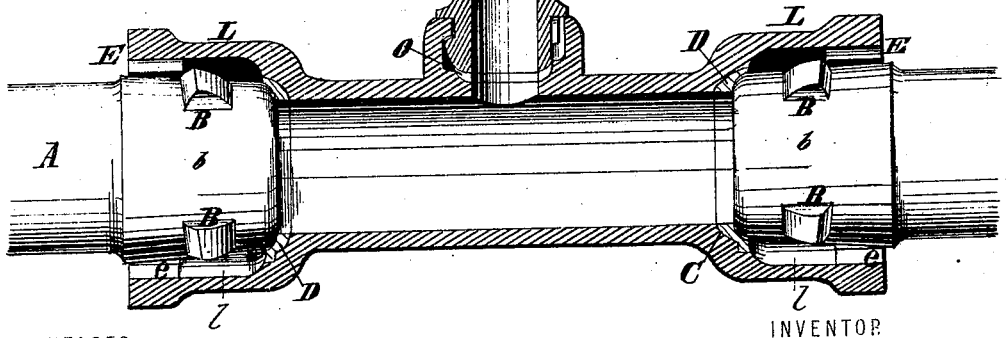
WITNESSES
Chas. J. Gooch
LeBlond Burdett
INVENTOR
Andrew O'Neill
By Knight Bros. Attorneys.

UNITED STATES PATENT OFFICE.

ANDREW O'NEILL, OF BALTIMORE, MARYLAND.

IMPROVEMENT IN MODES OF CONSTRUCTING AND LAYING MAIN AND SERVICE PIPES FOR WATER, GAS, &c.

Specification forming part of Letters Patent No. 179,947, dated July 18, 1876; application filed December 27, 1875.

*To all whom it may concern:*

Be it known that I, ANDREW O'NEILL, of Baltimore, in the State of Maryland, have invented a new and Improved Mode of Constructing and Laying Main and Service Pipes, for Water, Gas, and other purposes, of which the following is a specification:

My improved pressure-pipes are constructed with a chilled convex spigot end, with a fillet, on which are formed connecting-lugs with convex faces fitting corresponding concave faces, lugs, or flanges in the bell end of the next section, the curvature of the working faces of the lugs affording play to the joint. The bell end is constructed with an annular seat for the reception of a gasket of lead, soft rubber, or other compressible material, which is formed on either face with a feather-edge or annular lip to adapt it to be more readily compressed to fit the seat in the bell and the pipe end which presses it on said seat. The gasket is also formed with radial lugs fitting in corresponding notches in the bell to prevent its rotation as the spigot end of the pipe is twisted into position. The bell is also formed with an internal flange and annular recess to adapt it for the reception and packing of a cut or a common pipe, the end of which may be of plain cylindrical form, and not furnished with my peculiar coupling-lugs. The shoulder of the bell is formed with radial flanges for the reception of a twisting-jack, or of a jenny, by which the last section is held while the new one is twisted in position. The inclined shape necessary to give the action of a screw to the coupling-lugs may be made on the lugs of the spigot end, or the flanges of the bell end, or both. A suitable stop is provided to limit the turning of the spigot end within the bell. A dead end, with coupling devices similar to those on the spigot end of the pipe, is provided to close a terminal section.

The invention further consists in the provision of a ferrule with a tapering spigot end surrounded by a thimble of soft material to form a service-connection by driving said thimble into an opening which may be drilled in the main pipe.

The invention further consists in providing a T or intersection with a gasket-seat and flanges analogous to those of the pipe-bell for the optional reception of an annular cap or a service-T or a plain service-pipe.

The invention further consists in the peculiar construction of a cap to close the said outlet, and to either hold a tight gasket or to receive a pipe, which may be screwed into said annular cap at will.

In the accompanying drawing, Figure 1 is a perspective view of the ends of a pipe-section illustrating my invention. Fig. 2 is a longitudinal section of the bell end with a dead end inserted therein. Fig. 3 is an elevation of the spigot end. Fig. 4 is a longitudinal section of my peculiar concavo-convex gasket for use in connection with the conical spigot and bell end. Fig. 5 is a horizontal section of a service-T, the main T being shown in plan beneath it. Fig. 6 is a vertical longitudinal section on the line 7 7, Fig. 5. Fig. 7 is a perspective view of my improved annular cap. Fig. 8 is a sectional elevation of the ferrule and thimble for service-connection to a main pipe.

The spigot end of the pipe A is cast in a chill-mold, with a conical end, and with lugs B projecting from a fillet, *b*, and made convex on their working-faces, so as to form a ball-and-socket or universal joint. The chilling extends both to the side and end. The pipe-bell L is constructed with a concave seat, C, and recesses *c*, to receive a lead gasket, D, and lugs *d'* thereon. E E represent the flanges with which the lugs B engage. The recess *l*, in the interior of the bell, is adapted for the reception of a cold-lead packing, (described in another application,) in case of necessity, to connect with a common pipe or with a cut section, which may lack the spigot end. The notches *e e* in the bell-flange E, which permit the passage of the lugs B in putting the parts together, may be plugged with wood when a plain cylindrical pipe is to be connected.

J J represent lugs on the shoulder of the bell for the application of a jenny and a jack, by which the last-placed section is held securely, and the next screwed into it. K are stops to limit the turning of the spigot end A within the bell L. D is a concavo-convex gasket of lead, soft rubber, or other compressible material formed on its respective faces, with annular lips or feather-edge flanges $d$, and on its periphery with lugs $d'$. The convex side of the gasket is placed in the concave seat C, within the base of the bell L, and the lugs $d'$ fitting in radial recesses in said seat prevent the turning of the gasket as the spigot end A is screwed home upon it, the lips $d$ on either face causing a perfectly tight joint to be formed with moderate pressure.

A dead end, R, as shown in Fig. 2, is provided with a chilled conical extremity, $b$, and holding-lugs B, similar to those of the spigot ends of the pipe-sections, so as to close the bell end of a terminal section by the aid of the gasket D, already described.

To provide for the connection of service-pipes without the costly operation of drilling, I provide at each crossing an opening, cast by means of suitable cores in the original manufacture of the pipes, with recesses $e$, flanges E, and gasket-seats C, similar to those of the main joints, and adapted to receive either a single pipe, such, for example, as the supply-pipe of a lamp-post, or a T or cross pipe, Figs. 5 and 6, with connections M', which may lead to two lamp-posts on opposite corners of the street-crossing.

N represents an annular cap or stopper, formed with lugs B, to engage with the sectional screw-flanges E of the intersection outlet O, and with an internal screw-thread, $n$, by which a service-pipe may be attached, as, for example, the supply-pipe of a lamp-post. When this cap N is used simply to close the opening O, it is screwed down on a disk of metal, or any impervious material, to form a tight stopper.

To provide for the ready tapping of the mains at points where service-openings are not made at the time of manufacture, I employ a ferrule, P, Fig. 8, with a tapered end, covered by a thimble, $p$, of copper, or other metal sufficiently soft to form a joint. Q represents a projection for driving.

My improved system of laying main and service pipes possesses many advantages over the old mode. Hot-lead joints being entirely dispensed with avoids the necessity for wide excavations, and the time and labor usually occupied in making fire and melting lead and running it into the joints.

My improved mains may be laid in trenches one-half of the width of those required to manipulate common pipe, thus greatly reducing the cost and labor of excavating, refilling, and repaving, and especially effecting an enormous saving in laying pipes in rock, which is a consideration of great importance in some cities.

Dispensing with the use of fire and hot lead in forming the joints adapts my system for the laying of pipes in water without difficulty. Hydraulic cement may be run around the joints for additional security.

With my system of joining pipes, the strains applied being longitudinal, instead of radial or expansive, much of the metal required to re-enforce the bell with the old style of coupling is dispensed with. The joint possesses great facility for taking apart when necessary.

By reason of the construction of the convex lugs and corresponding concave seats therefor the joint is not impaired, but rather tightened, by a deflection of the pipe. If great deflection of the pipe be necessary, the face of one lug may be partially cut away, as shown at $b'$, Fig. 5.

The lugs B are formed on a fillet, $b$, for additional strength, and made tapering to discharge from the chill. The chill being larger than the body of the mold makes the spigot end of the pipe fully as strong as any other part.

Chilling is adopted as the most economical mode of producing a smooth surface; but it is evident that the purpose may be accomplished by turning the pipe end. The smooth surface imparted to the spigot end, either by chill-casting or by turning, adapts it to turn freely on the end gasket without rucking up.

Having thus described my invention, the following is what I claim as new and desire to secure by Letters Patent—

1. The chilled convex pipe end constructed, substantially as herein described, with lateral lugs formed with faces convex in both directions, in combination with bearings within the bell, curved to correspond therewith, substantially as and for the purpose set forth.

2. The pipe-bell, constructed with a recessed flange, E, for the reception of the lugs B, and with a notched concavity, C, for the gasket D.

3. The lugs J on the external shoulder of the bell, to receive a jenny, by which one section is held while the other is twisted by a jack.

4. The stop K, to limit the turning of the pipe within the bell, as explained.

5. The concavo-convex gasket D, constructed on either side with an annular ridge or feather edge, and with external lugs $d'$, substantially as and for the purposes set forth.

6. The combination of a conical pipe end, cast with holding-lugs or their equivalent B, a bell end flanged and recessed to receive said lugs, and a compressible gasket, to form a tight flexible joint, substantially as herein set forth.

7. The chilled fillet $b$, formed on the spigot end of the pipe, with lugs projecting therefrom, as set forth.

8. The dead end R, constructed as herein described, with a conical bearing-face, $b$, and convex lugs, B, adapted to the bell end, above described, and with lugs for the application of a jack, for twisting in the said dead end, as explained.

9. The ferrule P, constructed with a tapering end surrounded by a thimble, *m*, of softer metal, to form a close joint when driven into an aperture in the main, as explained.

10. The outlet O at the T or intersection of the main, constructed with a gasket-seat and inclines, formed as described, for the optional reception of a cap, N, or a service-T.

11. The annular cap N, employed to close the outlet O by means of a suitable gasket, or to receive a wrought-iron or other service-pipe.

ANDREW O'NEILL.

Witnesses:
 OCTAVIUS KNIGHT,
 CHAS. J. GOOCH.